US 6,563,628 B2

(12) United States Patent
Kitabayashi et al.

(10) Patent No.: US 6,563,628 B2
(45) Date of Patent: May 13, 2003

(54) GAIN TILT FREE OPTICAL FIBER AMPLIFIER IN A WIDE DYNAMIC GAIN RANGE

(75) Inventors: Tomoharu Kitabayashi, Sakura (JP); Tetsuya Sakai, Sakura (JP); Takafumi Kashima, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/789,459

(22) Filed: Feb. 20, 2001

(65) Prior Publication Data

US 2001/0017728 A1 Aug. 30, 2001

(30) Foreign Application Priority Data

Feb. 25, 2000 (JP) ........................................ 2000-049942
Sep. 1, 2000 (JP) ........................................ 2000-266256

(51) Int. Cl.[7] .................................................. H01S 3/00
(52) U.S. Cl. .................................................. 359/337.1
(58) Field of Search .................... 385/140; 359/337.1, 359/337.11, 337.4, 341.1, 341.4, 341.42, 341.43

(56) References Cited

U.S. PATENT DOCUMENTS

| | | | | |
|---|---|---|---|---|
| 5,274,734 A | * | 12/1993 | Jin et al. .................. | 359/337.3 |
| 5,541,766 A | * | 7/1996 | Mizrahi et al. ............. | 359/337 |
| 5,633,974 A | * | 5/1997 | Chia ......................... | 385/140 |
| 5,701,194 A | * | 12/1997 | Meli et al. ................. | 359/124 |
| 5,881,199 A | * | 3/1999 | Li ............................. | 385/14 |
| 6,025,947 A | * | 2/2000 | Sugaya et al. ............. | 359/134 |
| 6,049,413 A | * | 4/2000 | Taylor et al. .............. | 359/161 |
| 6,282,361 B1 | * | 8/2001 | Nishimura et al. ........ | 385/10 |
| 6,363,916 B2 | * | 4/2002 | Kawakami et al. ........ | 123/491 |

FOREIGN PATENT DOCUMENTS

| | | | | |
|---|---|---|---|---|
| EP | 0570941 A1 | * | 11/1993 | ............. H01S/3/06 |
| JP | 05-048207 | | 2/1993 | ............. H01S/3/18 |
| JP | 2746776 B2 | | 5/1998 | ............. H01S/3/18 |
| WO | WO 9836513 | * | 8/1998 | ........... H04B/10/17 |

OTHER PUBLICATIONS

Kani et al. 'Wideband and flat–gain optical amplification from 1460 to 1510 by serial combination of a thulium–doped fluoride fibr amplifier and fibre Raman amplifier'. Electronics Letters, Jun. 10, 1999, vol. 35, No. 12, pp. 1004–1006.*

Bass et al. 'Handbook of Optics'. McGraw–Hill, Inc. pp. 10.8–10.9.*

Sugaya Y., et al., "Novel configuration for low–noise and wide dynamic–range Er–doped fiber amplifier for WDM systems," Optical Amplifiers and Their Applications, Jun. 15, 1995, vol. 18, Lecture No. FC3, pp. 158–161.

Naito, T. et al., "Active Gain Slope Compensation in Large–Capacity, Long–Haul WDM Transmission System," 10th Optical Amplifiers and Their Applications, Jun. 9, 1999, Lecture No. WC5, pp. 36–39.

Hatayama, H. et al., "Variable attenuation slope compensator (VASC) using silica–based planar lightwave circuit technology for active gain slope control in EDFAs," Optical Fiber Communication Conference, Technical Digest, Mar. 8, 2000, WH7 pp. 142–144.

(List continued on next page.)

Primary Examiner—Thomas G. Black
Assistant Examiner—Deandra M. Hughes
(74) Attorney, Agent, or Firm—Bell, Boyd & Lloyd LLC (57) ABSTRACT

An optical fiber amplifier comprises an optical fiber for light loss which is provided in a later stage than an optical fiber amplification section or midway therein, the amount of light absorption and the wavelength dependency of the absorption of the optical fiber changing according to the power of input light; whereby the optical fiber amplifier can maintain flat gain in a wide wavelength band, the gain flatness not changing over a wide dynamic range and being maintained irrespective of variation in the power of input signal light.

9 Claims, 5 Drawing Sheets

OTHER PUBLICATIONS

Mitamura, N. et al., "Flexibly Variable Spectrum Equalizer for Spectral Tilt Compensation," Optical Fiber Communication Conference, Technical Digest, Mar. 8, 2000, WF2 pp. 87–89.

Tanaka, N. et al., "Active gain slope controlled for transoceanic WDM transmission systems," The Institute of Electronic, Information and Communication Engineers Proceeding of the 1999 IEICE General Congress, Mar. 25, 1999, vol. 2, p. 471 Abstract Only.

Yadlowsky, M., "EDFA without dynamic gain tilt using excited–state trapping," OSA trends in Optics and Photonics Series, Jul. 27, 1998, vol. 25, pp. 24–27.

Takeda, M., et al., "Active Gain–Tilt Equalization by Preferentially 1.43 micro m–or 1.48 micro m–Pumped Raman Amplification," 10th Optical Amplifiers and Their Applications, Jun. 9, 1999, 1999, Lecture No. ThA, pp. 76–79.

* cited by examiner

GAIN TILT FREE OPTICAL FIBER AMPLIFIER IN A WIDE DYNAMIC GAIN RANGE

BACKGROUND OF THE INVENTION

1. Field of the Invention

The present invention relates to an optical fiber amplifier. This specification is based on Japanese Patent Applications Nos. 2000-49942 and 2000-266256, the contents of which are incorporated herein by reference.

2. Background Art

Recently, an optical fiber amplifier which uses a rare earth doped optical fiber, comprising a rare earth element such as erbium (Er) and praseodymium (Pr), doped to the core of an optical fiber comprising quartz glass or the like, has been developed to a level where it can be practically used.

The optical fiber amplifier using an Er-doped fiber (the Er-doped optical fiber amplifiers) outputs with particularly high saturation and high gain in 1.55 $\mu$m band. For this reason it is applied in various commercial systems, such as basic transmission systems and subscription systems.

Most noticeably, the optical fiber amplifier is being applied in WDM (wavelength division multiplex) transmission using more than several waves of signal light. There is a demand to improve the amplification characteristics of the optical fiber amplifier, with the aim of obtaining high-performance WDM transmission.

The Er-doped optical fiber amplifiers (EDFAs) are required to have high output power, wide bandwidth and flat gain profile. Especially, the gain flatness of EDFAs is a very important factor in wide-band long-haul WDM transmission systems. There are currently several different techniques for passive gain equalization, for example, a long period fiber grating, a discrete type fiber and a planer lightwave circuit type filter. These positive gain equalizers are designed to certain fixed operating conditions of the Er-doped optical fiber amplifier (EDFA), therefore the EDFA with the passive gain equalizer cannot adapt itself to changes in the operating conditions. The gain flatness deteriorates when the gain of EDFA changes due to variations in the number of signal wavelengths or in transmission fiber loss. To cope with the deterioration of gain flatness, several techniques have been proposed to maintain the gain flatness actively, such as the techniques described in "Optical Amplifiers and their Applications 1995 Lecture Number FC3" and "Optical Amplifiers and their Applications 1999 Lecture Number WC5".

The former optical fiber amplifier comprises a variable attenuator inserted between two Er-doped optical fiber amplifiers. Here, "Er-doped optical fiber amplifier" represents an optical fiber amplifier which broadly comprises an Er-doped optical fiber, a pumping light source which inputs pumping light to the Er-doped optical fiber, a coupler, and the like.

In this optical fiber amplifier, the gains of the first and second Er-doped optical fiber amplifiers are made constant. Therefore, the gain/wavelength characteristics do not vary, even when the power of input light (signal input power) varies.

Furthermore, since the variable attenuator has no wavelength characteristics, the gain/wavelength characteristics do not vary from the first Er-doped optical fiber amplifier to the variable attenuator, or after passing the variable attenuator.

The output power of the optical fiber amplifier varies unless the variable attenuator is controlled. Therefore, the attenuation of the attenuator is changed by an amount equivalent to the variation in the signal input power in order to keep the output power constant. As a result, the optical fiber amplifier maintains gain flatness, even when the signal input power varies.

The latter optical fiber amplifier comprises a variable loss slope attenuator, instead of the variable attenuator mentioned above.

However, these optical fiber amplifiers require control systems and variable attenuator to keep gain flatness and output constant. Consequently, they have a drawback that their constitutions are complex and expensive. In addition, they are not sufficiently reliable.

SUMMARY OF THE INVENTION

It is an object of this invention to provide an optical fiber amplifier which can obtain gain flatness in a wide wavelength band. It is another object of this invention to provide an optical fiber amplifier in which gain flatness does not vary in a wide gain dynamic range, thereby maintaining gain flatness even when the input signal light varies. It is yet another object of this invention to provide an optical fiber amplifier which has a simple constitution and is inexpensive. It is yet another object of this invention to provide an optical fiber amplifier which has high reliability.

In order to achieve the above objects, the optical fiber amplifier according to this invention comprises an optical fiber amplification section; and an optical fiber for light loss which is provided in a later stage than the optical fiber amplification section or midway therein. The amount of light absorption and the wavelength dependency of the absorption (i.e. absorption characteristic) of the optical fiber change according to the power of input light.

This invention obtains the following effects.

It is possible to provide an optical fiber amplifier which can maintain gain flatness in a wide wavelength band, the gain flatness is not changing over a wide dynamic range and being maintained irrespective of variation in the power of input signal light.

Further, the optical fiber used in light absorption is comparatively inexpensive, has a simple constitution and control, and high reliability. Therefore, the optical fiber amplifier can be made inexpensive and highly reliable.

DESCRIPTION OF THE PREFERRED EMBODIMENTS

Figure 1:
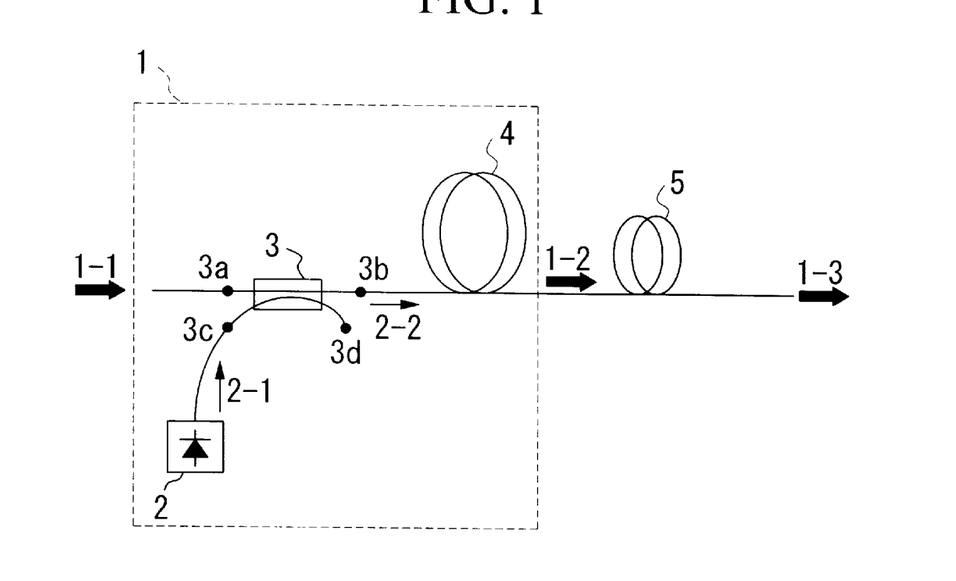
FIG. 1 is a diagram showing the constitution of a first embodiment of the optical fiber amplifier according to this invention.

FIG. 1 is a diagram showing the constitution of a first embodiment of the optical fiber amplifier according to this invention.

The optical fiber amplification section 1 is configured by connecting one output terminal 3b of a WDM coupler (wavelength division and coupling coupler) 3 to the input end of an Er-doped optical fiber (EDF) 4 which amplifies a signal light, and connecting an input terminal 3c of the WDM coupler 3 to a pumping light source (semiconductor laser, wavelength 1480 nm) 2.

The output end of the Er-doped optical fiber 4 is connected to the input end of a Tm-doped optical fiber (TDF) 5, completing the constitution of the optical fiber amplifier.

The Er-doped optical fiber 4 comprises quartz glass or the like, and having a core and a cladding having a lower refractive index than the core. The core is provided in the center of the Er-doped optical fiber 4, and the cladding is provided around the core. The doped Er amplifies the signal light in the core.

The Er-doped optical fiber 4 in this embodiment has a relative refractive index difference of 2.1%, a core diameter of 3.3 $\mu$m, and a cut-off wavelength of 1.16 $\mu$m.

The WDM coupler 3 is a fused type fiber coupler which comprises, for example, two optical fibers which are arranged in series, heated midway, spliced and elongated to form a light coupling section where the light couples and divides. The WDM coupler 3 consequently has two input terminals 3a and 3c, and two output terminals 3b and 3d. Since the output terminal 3d is not used in this example, it is processed to become a nonreflective end terminal.

The Tm-doped optical fiber 5 comprises a rare earth element doped optical fiber in which thulium (Tm) has been doped to the core in order to lose signal light, and functions as an optical fiber for light loss in which the amount of signal light absorption and the wavelength dependency vary according to the power of input light.

The Tm-doped optical fiber 5 of this embodiment has a relative refractive index difference of 0.8%, a core diameter of 4.3 $\mu$m, and a cut-off wavelength of 0.7 $\mu$m.

Let us consider an example where this optical fiber amplifier is applied in WDM transmission. When a signal light 1—1 having a wavelength in 1.55 $\mu$m band (e.g. 1540 to 1560 $\mu$m) is input from the input terminal 3a of the WDM coupler 3, the signal light 1—1 inputs into the Er-doped optical fiber 4 and propagates in the Er-doped optical fiber 4. A wavelength division multiplexed signal light having a comparatively wide wavelength band is used as the signal light 1—1.

A pumping light source 2 generates pumping light 2-1 having a wavelength of 1480 nm. When the pumping light 2-1 is input from the input terminal 3c of the WDM coupler 3, it passes through the output terminal 3b and inputs into the Er-doped optical fiber 4 as shown by reference code 2—2 in FIG. 1. The pumping light 2—2 amplifies the signal light 1—1, which becomes signal light 1-2.

Then, the amplified signal light 1-2 inputs into the Tm-doped optical fiber 5. As explained later, when the gain of the signal light 1-2 is dependent on the wavelength, the gain can be made flat by absorption of light having a wavelength with high gain.

Figure 2:
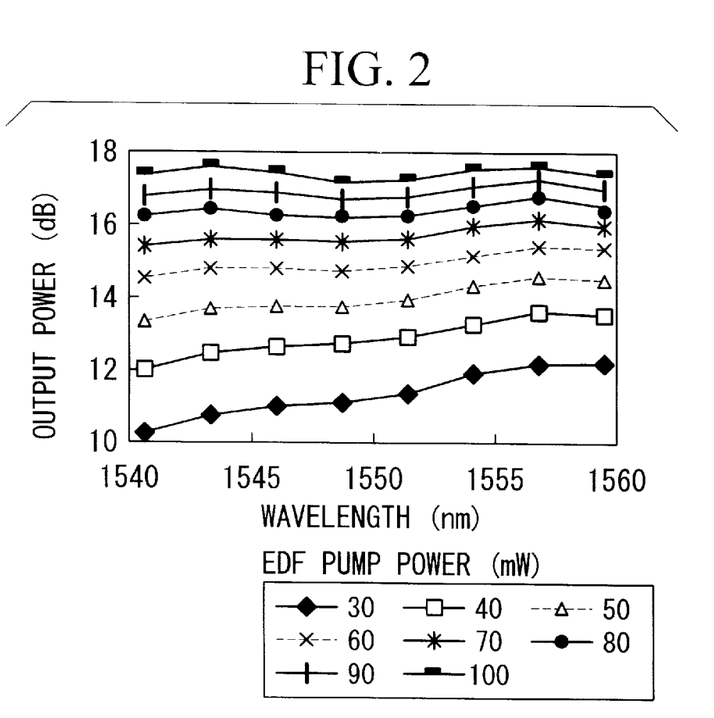
FIG. 2 is a graph showing gain/wavelength characteristics of an Er-doped optical fiber of the optical fiber amplifier shown in FIG. 1.

FIG. 2 is a graph showing the gain/wavelength characteristic of the signal light 1-2 when the signal light 1—1 is constant and the power of the pumping light 2—2 is decreased from 100 mW to 30 mW.

The graph shows that the gain/wavelength characteristic is flat when the power of the pumping light 2—2 is 100 mW, but gain/wavelength characteristics show the different slope under the different power of the pumping light 2—2. This indicates that the gain has wavelength-dependency. In this example, the gain tilt in a wavelength band of between 1540 nm and 1560 nm is 0.3 dB per 1 dB of total gain.

On the other hand, since the Tm-doped optical fiber 5 is an optical fiber for light loss, the amount of light absorption and the wavelength dependency change according to the power of the input light.

Figure 3:
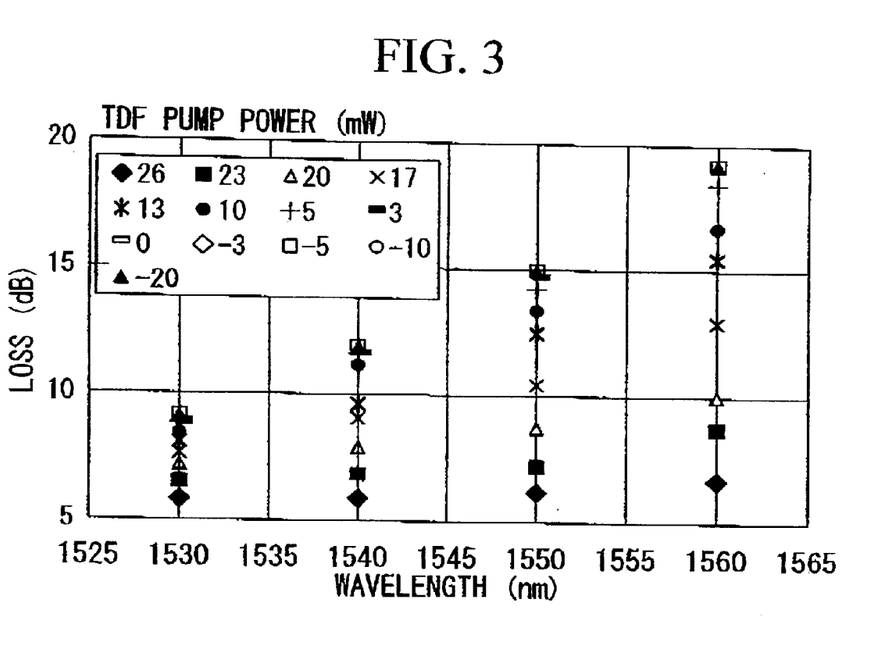
FIG. 3 is a graph showing loss/wavelength characteristics of a Tm-doped optical fiber of the optical fiber amplifier shown in FIG. 1.

FIG. 3 is a graph showing the loss/wavelength characteristic of the Tm-doped optical fiber 5 prior to configuring the optical fiber amplifier. This graph shows measurements of the relationship between wavelength and loss of input light (amount of absorption) when light was input to the Tm-doped optical fiber 5 while increasing the power from −20 dBm to +26 dBm.

When the power of the input light is between −20 dBm and +3 dBm, most of the plotted points coincide and have almost the same loss/wavelength characteristics. Within this input power level, the loss/wavelength characteristics have positive slope, indicating high wavelength dependency. In contrast, at a high level of input light power of between +5 dBm to +26 dBm, the loss/wavelength characteristics gradually flats. In addition, the total loss decreases, showing flat loss/wavelength characteristics with no wavelength dependency.

Therefore, in the optical fiber amplifier shown in FIG. 1, when the pumping light 2—2 has low power, the gain of the signal light 1-2 which was amplified by the Er-doped optical fiber 4 shown in FIG. 2 has positive slope, indicating wavelength dependency. The signal light 1-2 is input into the Tm-doped optical fiber 5. When the power of this input light is low, the loss of the Tm-doped optical fiber 5 has positive slope, indicating high wavelength dependency, such as that shown in FIG. 3. Consequently, the wavelength dependency of the gain of the signal light 1-2 is compensated by the wavelength dependency of the loss of the Tm-doped optical fiber 5, and thereby made flat.

On the other hand, when the power of the pumping light 2—2 is high, the gain of the signal light 1-2 has flat wavelength characteristics and the power of the signal light 1-2 is high. Therefore, the Tm-doped optical fiber 5 similarly obtains flat loss/wavelength characteristics. Consequently, the wavelength dependency of the gain of the signal light 1-2 is unchanged when the signal light 1-2 is transmitted through the Tm-doped optical fiber 5, and gain flatness is maintained.

Figure 4:
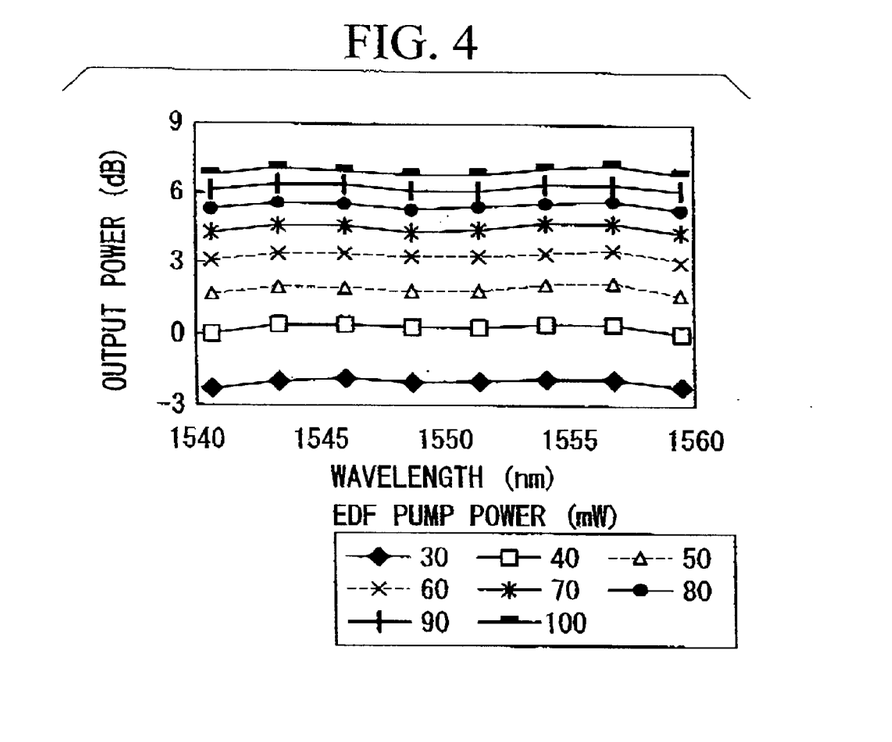
FIG. 4 is a graph showing gain/wavelength characteristics of the optical fiber amplifier shown in FIG. 1.

As a result, the optical fiber amplifier obtains signal light 1-3 which has the flat gain/wavelength characteristic shown in FIG. 4, irrespective of change in the power of the pumping light 2—2.

By combining the Er-doped optical fiber 4 and the Tm-doped optical fiber 5 in this way, it is possible to achieve an optical fiber amplifier which can obtain flat gain/wavelength characteristics in a wide wavelength band of between 1540 nm and 1560 nm. Moreover, the gain flatness is unaffected by change in the total gain of the signal light 1-3 caused by an increase or decrease in the power of the pumping light 2—2.

A similar effect can be obtained when the total gain of the signal light 1-3 changes due to an increase or decrease in the power of the signal light 1—1.

Figure 5:
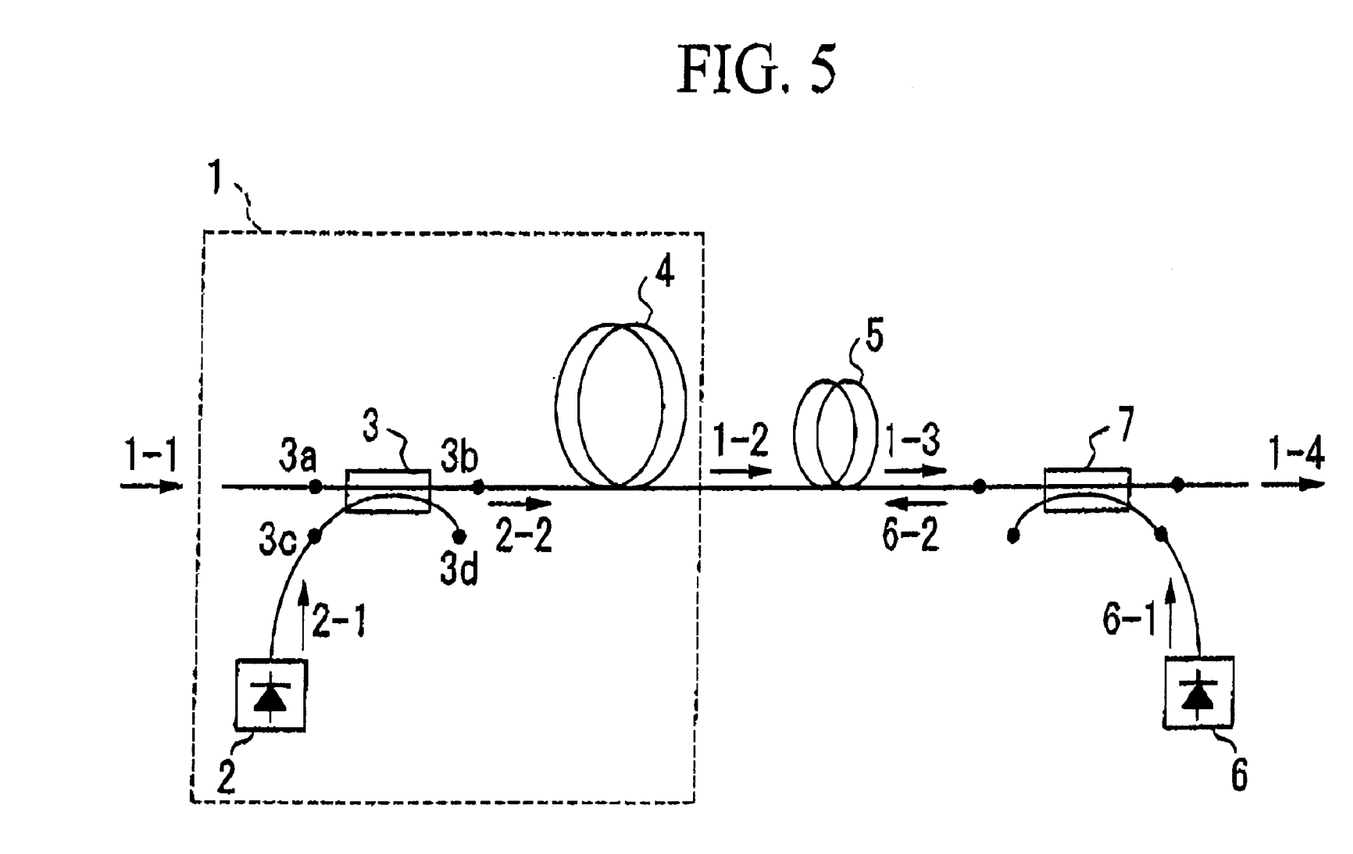
FIG. 5 is a diagram showing the constitution of a second embodiment of the optical fiber amplifier according to this invention.

FIG. 5 is a diagram showing the constitution of an optical fiber amplifier according to a second embodiment of this invention. Parts of the constitution which are practically identical to those of the optical fiber amplifier in the first embodiment are represented by the same reference codes, and will not be explained in detail.

In the first embodiment, the loss/wavelength characteristic of the Tm-doped optical fiber 5 is determined by the power of the signal light 1-2.

As a consequence, the loss/wavelength characteristic of the Tm-doped optical fiber 5 substantially matches the gain/wavelength characteristic of the Er-doped optical fiber 4. Since the loss/wavelength characteristic of light in the Tm-doped optical fiber 5 is determined by the power of the signal light 1-2, it is difficult to precisely control this characteristic.

Accordingly, in the second embodiment, absorption loss control light 6-1 from an absorption loss control light source 6 is input into the Tm-doped optical fiber 5 from the rear of the Tm-doped optical fiber 5 via a WDM coupler 7.

In this case, the amount of the light absorption in the Tm-doped optical fiber 5 and the wavelength dependency vary according to the sum of the power of the signal light 1-2 and the power of the absorption loss control light 6-2 which has been transmitted through the WDM coupler 7.

Therefore, by controlling the power of the absorption loss control light 6-2 so as to compensate any change in the gain flatness of the signal light 1-2, caused by change in the input signal power (the power of the signal light 1—1), it is possible to adjust the wavelength dependency and the amount of the light absorption in the Tm-doped optical fiber 5. As a result, the gain flatness of the optical fiber amplifier is unaffected by change in the input signal power.

Incidentally, although the Tm-doped optical fiber 5 is provided behind the Er-doped optical fiber 4 in these embodiments, the Tm-doped optical fiber 5 can be inserted midway in the Er-doped optical fiber 4 instead.

Figure 6:
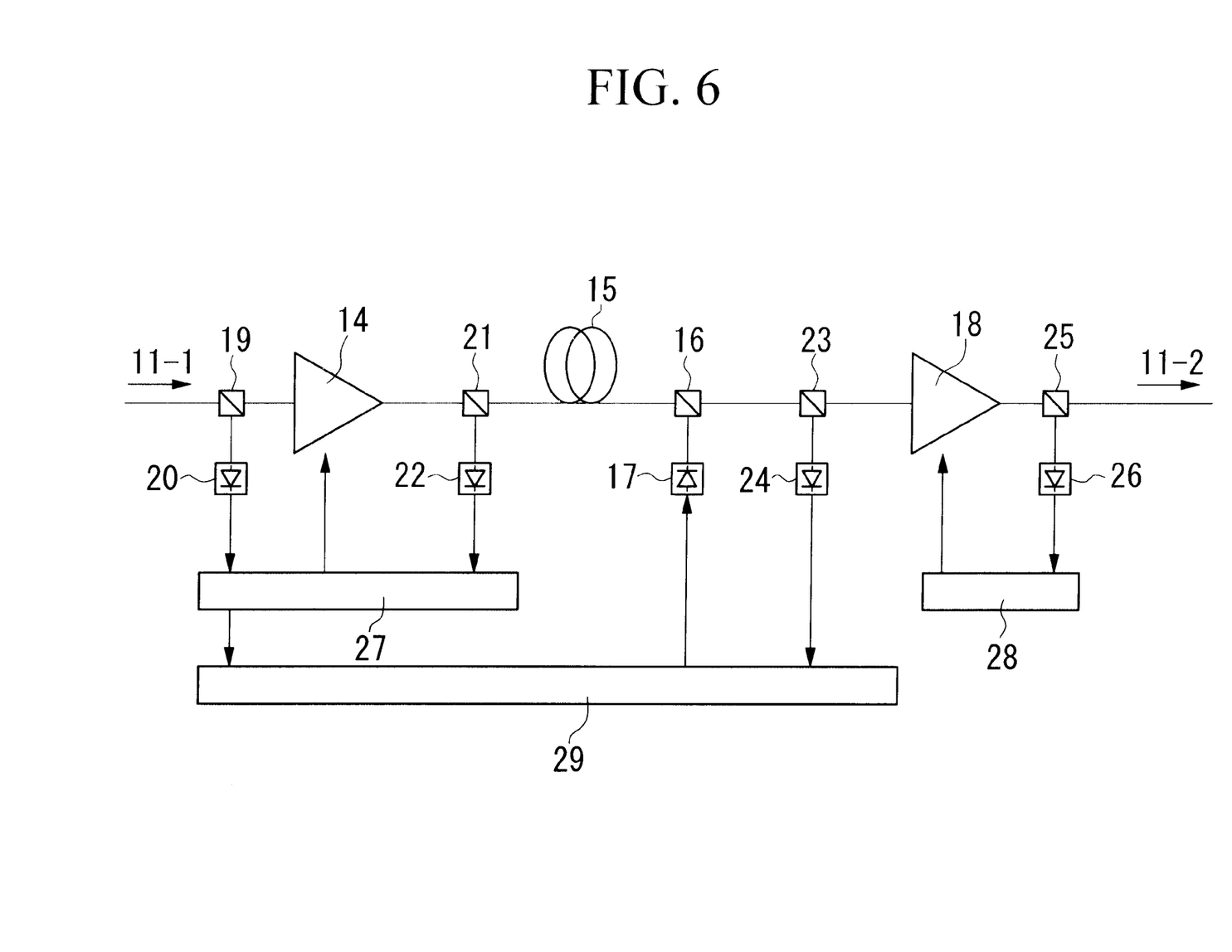
FIG. 6 is a block diagram showing a third embodiment of the optical fiber amplifier according to this invention.

FIG. 6 is a diagram showing the constitution of a third embodiment of the optical fiber amplifier according to this invention.

Since optical fiber amplifiers comprising Er-doped optical fiber are widely used in WDM transmission, the input light is usually a wavelength multiplexed signal having a wavelength in 1.55 μm band (e.g. 1540 to 1560 nm).

This optical fiber amplifier comprises a first Er-doped optical fiber amplification section 14, a second Er-doped optical fiber amplification section 18, and a Tm-doped optical fiber 15 which is provided therebetween. As in the optical fiber amplification section 1 shown in FIG. 1, the first and second Er-doped optical fiber amplification sections 14 and 18 broadly comprise an Er-doped optical fiber, a pumping light source, a coupler which inputs light to the Er-doped optical fiber, and the like.

The Tm-doped optical fiber 15 comprises Tm doped to the core of a quartz glass-type optical fiber. The Tm-doped optical fiber 15 in this embodiment has a relative refractive index difference of 0.8%, a core diameter of 4.3 μm, and a cut-off wavelength of 0.7 μm.

The Tm-doped optical fiber 15 absorbs light in 1.55 μm band.

Figure 7:
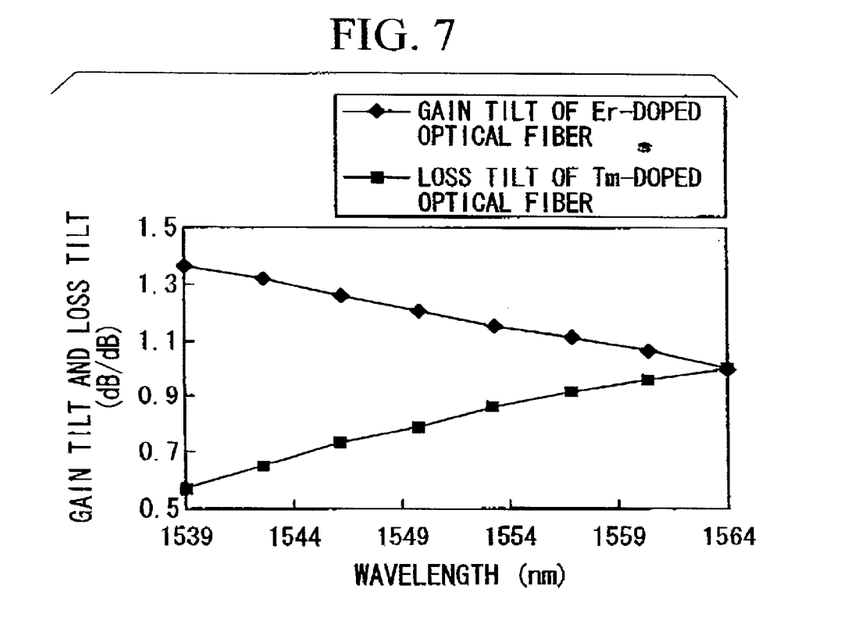
FIG. 7 is a graph showing the relationship between the gain tilt of an Er-doped optical fiber and the loss tilt of a Tm-doped optical fiber with respect to the wavelength.

FIG. 7 is a graph showing the relationship between the gain tilt of the Er-doped optical fiber and the loss tilt of the Tm-doped optical fiber with reference to the wavelength. The wavelength of the input light is the same in each case.

In a wavelength band of between 1539 to 1564 nm, the gain tilt of the Er-doped optical fiber and the loss tilt of the Tm-doped optical fiber are both linear with respect to the wavelength. The slopes of these tilts have opposite signs and their absolute values are almost the same.

Either of the Er-doped optical fiber and the Tm-doped optical fiber 15 can be selected depending on which is appropriate for the characteristics required by the optical fiber amplifier.

When input signal light 11-1 is input to the optical fiber amplifier, the input signal light 11-1 is sequentially amplified by the first Er-doped optical fiber amplification section 14 and the second Er-doped optical fiber amplification section 18, and the Tm-doped optical fiber 15, provided therebetween, absorbs the signal light which has a wavelength producing large gain. As a result, the optical fiber amplifier obtains gain/wavelength characteristics which are flat with respect to the wavelength, and outputs the output signal light 11-2 having constant output power.

To obtain the output signal light 11-2 having constant power and gain flatness despite variation in the power of the input signal light 11-1, the following control units are provided respectively in the first Er-doped optical fiber amplification section 14, the second Er-doped optical fiber amplification section 18, and the Tm-doped optical fiber 15.

The control unit of the first Er-doped optical fiber amplification section 14 has the following type of constitution.

Dividing sections 19 and 21 are provided in the front and rear stages of the first Er-doped optical fiber amplification section 14. Part of the signal light (i.e. the input signal light 11-1) and part of the signal light output from the first Er-doped optical fiber amplification section 14 divide in the dividing sections 19 and 21 respectively.

The divided lights are received in receivers 20 and 22 respectively, converted to electrical signals in correspondence with the levels of the received light, and input to a gain constant controller 27. The levels of the received light are also input to an absorption loss controller 29 which will be explained later.

The gain constant controller 27 compares the levels of the light received by the receivers 20 and 22, and keeps the gain of the first Er-doped optical fiber amplification section 14 constant so that a constant ratio is maintained between the power of the signal light input to the first Er-doped optical fiber amplification section 14 and the power of the output signal light.

More specifically, the gain in the first Er-doped optical fiber amplification section 14 is kept constant by increasing/decreasing the power of the pumping light which is input to the first Er-doped optical fiber amplification section 14 from the pumping light source provided therein. A semiconductor laser having a wavelength of, for example, 980 nm is used as the pumping light source.

Since the gain constant controller 27 keeps the gain constant in this way, the gain/wavelength characteristic of the first Er-doped optical fiber amplification section 14 is always constant irrespective of change in the power of the input signal light 11-1.

The control unit of the second Er-doped optical fiber amplification section 18 has the following type of constitution.

A dividing section 25 is provided in the rear stage of the second Er-doped optical fiber amplification section 18. Part of the signal light (i.e. part of the signal light 11-2 which is output from the optical fiber amplifier) divides in the dividing section 25. The divided light is received by a receiver 26, converted to an electrical signal according to the received light level, and input to a gain controller 28.

The gain controller 28 controls the gain of the second Er-doped optical fiber amplification section 18 so that the received light level in the receiver 26 is constant, i.e. so that the power of the output signal light 11-2 is constant.

More specifically, the gain in the second Er-doped optical fiber amplification section 18 is changed by increasing/decreasing the power of the pumping light which is input to the second Er-doped optical fiber amplification section 18 from the pumping light source provided therein.

As a result, the power of the output signal light 11-2 in the optical fiber amplifier can be always kept constant.

When the Tm-doped optical fiber 15 is not controlled under such control conditions, or when it is excluded from the constitution, the wavelength dependency of the gain in the first Er-doped optical fiber amplification section 14 is not affected by change in the power of the input signal light 11-1, since the gain is always kept constant. However, since the gain of the second Er-doped optical fiber amplification section 18 is controlled in order to keep the power of the output signal light 11-2 constant, the wavelength dependency of the gin in the second Er-doped optical fiber amplification section 18 is affected. Also, the wavelength dependency of the gain in the whole amplifier changes.

That is, the total gain of the optical fiber amplifier, obtained by combining the gains in the first Er-doped optical fiber amplification section 14 and the second Er-doped optical fiber amplification section 18, varies according to the power of the input signal light 11-1. Consequently, the wavelength dependency of the gain varies due to gain tilt as shown in the graph of FIG. 7, whereby the optical fiber amplifier loses the gain flatness.

In order to keep the gain flatness of the optical fiber amplifier, it is necessary to compensate the change in the gain/wavelength characteristic of the second Er-doped optical fiber amplification section 18, which varies depending on the power of the input signal light, in the Tm-doped optical fiber 15.

To achieve this, the control unit of the Tm-doped optical fiber 15 has the following type of constitution.

A dividing section 23 is provided between the Tm-doped optical fiber 15 and the second Er-doped optical fiber amplification section 18. Part of the signal light (i.e. part of the signal light which is output from the Tm-doped optical fiber 15) divides in the dividing section 23. The divided light is received by a receiver 24, converted to an electrical signal according to the received light level, and input to an absorption loss controller 29.

The absorption loss controller 29 detects the received light levels of the receivers 20 and 24. In other words, the absorption loss controller 29 detects the power of the input signal light 11-1 and the power of the signal light which is output from the Tm-doped optical fiber 15.

As shown in FIG. 7, in a wavelength band of between 1539 to 1564 nm, the gain tilt of the Er-doped optical fiber and the loss tilt of the Tm-doped optical fiber are both linear. Furthermore, their slopes have opposite signs and their absolute values are almost the same.

Therefore, the gain can be kept flat by providing the Tm-doped optical fiber 15, and changing the gain of the second Er-doped optical fiber amplifier section 18 and the absorption loss of the Tm-doped optical fiber 15 by an identical amount.

Consequently, when the power of the input signal light 11-1 of the optical fiber amplifier changes, changing the gain of the second Er-doped optical fiber amplification section 18, an absorption loss control light source 17 is controlled so that the received light level of the receiver 24 changes by only half of the amount of variation in the received light level of the receiver 20 in order to keep the gain flatness of the optical fiber amplifier. As a result, the absorption loss of the Tm-doped optical fiber 15 changes by only half of the amount of variation in the power of the input signal light 11-1, and the gain/wavelength characteristic of the optical fiber amplifier changes according to the loss tilt shown in FIG. 7. The signal light having the changed gain/wavelength characteristic is input to the second Er-doped optical fiber amplification section 18. In the second Er-doped optical fiber amplification section 18, the gain/wavelength characteristic of the optical fiber amplifier changes according to the gain tilt shown in FIG. 7 so as to cancel the change in the gain/wavelength characteristic of the Tm-doped optical fiber 15, thereby keeping the gain/wavelength characteristic flat.

The power of the divided light for control, which divides in the receivers 20, 22, and 24, is lower than transmitted signal light, most of the signal light being transmitted through the first Er-doped optical fiber amplification section 14, the Tm-doped optical fiber 15, and the second Er-doped optical fiber amplification section 18, and amplified thereby before being output as the output signal light 11-2.

A semiconductor laser is for example used as the absorption loss control light source 17.

The absorption characteristic of the Tm-doped optical fiber 15 is changed simply by controlling the amount of the absorption loss control light from the absorption loss control light source 17. Therefore, the optical fiber amplifier has a simple constitution, and is inexpensive and highly reliable.

Figure 8:
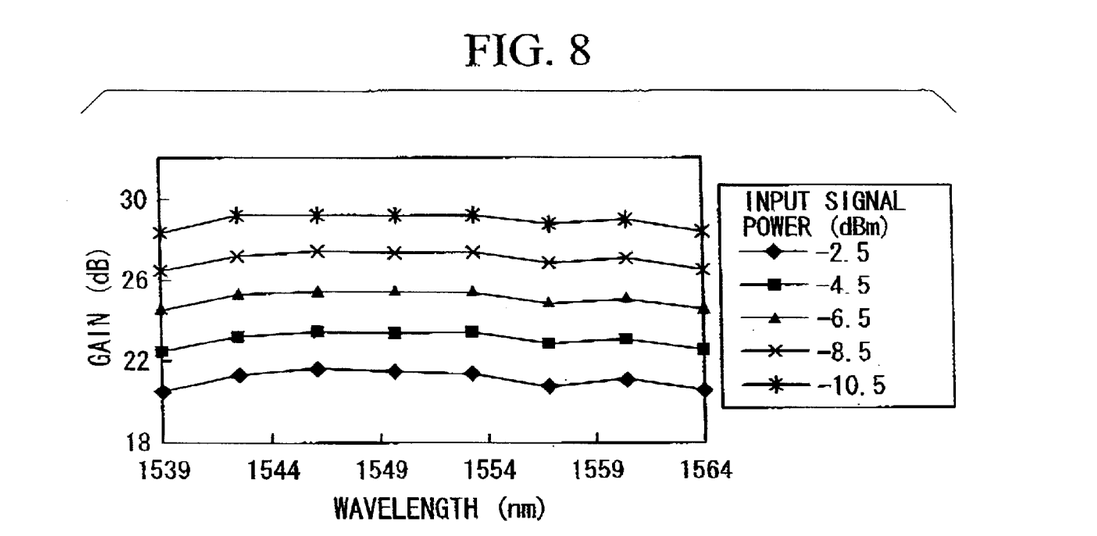
FIG. 8 is a graph showing measurements of gain/wavelength characteristics of the optical fiber amplifier shown in FIG. 6.

FIG. 8 is a graph showing measurements of the output signal light 11-2 of the optical fiber amplifier when the power of the input signal light 11-1 is changed. A laser diode (LD) of 1.61 $\mu$m was used as the absorption loss control light source. The maximum power of the absorption loss control light source 17 was 150 mW.

The graph shows measurements at each power of the input signal light 11-1.

The gain differs when the power of the input signal light 11-1 changes in this way. Nevertheless, the results were good, and show that flat gain is maintained within a wide wavelength band in each case.

The optical fiber amplifier in these examples amplifies signal light in 1.55 $\mu$m band (from 1540 nm to 1560 nm). For this reason, an Er-doped optical fiber is used as the optical fiber for light amplification, and a Tm-doped optical fiber is used as the optical fiber for light loss. However, the constitution is not limited to this arrangement, and the optical fibers can be selected as appropriate to the wavelength of the signal light to be amplified.

Pumping light having a wavelength of 1480 nm and 980 nm is used in pumping the signal light of 1.55 $\mu$m in the Er-doped optical fiber, but the constitution is not limited to this. The pumping light can be selected as appropriate for various types of optical fibers for amplification.

The optical fiber for light amplification comprises, for example, quartz glass or the like, a core provided in the center thereof, and a cladding which is provided around the core and has a lower refractive index than the core. A rare earth-doped optical fiber, which comprises a rare earth element doped to the core in order to amplify the light, is ideal.

A rare earth element, which comprises a rare earth element doped to the core in order to lose light, is ideal as the optical fiber for light loss. In order to improve the reliability of light loss, the host glass of the core should preferably comprise pure quartz glass.

Only at least one kind of rare earth element need be doped in the rare earth doped fiber, which is used as the optical fiber for light loss. The kind of the rare earth element is selected as appropriate, according to the wavelength band of the signal light to be amplified. Depending on the wavelength band of the light, the same rare earth element may sometimes be used in amplifying and sometimes in losing light.

In this embodiment, the signal light is within 1.55 μm band. The Er-doped optical fiber is ideal for amplifying light in this wavelength band, and the Tm-doped optical fiber is ideal for compensating the gin tilt of the Er-doped optical fiber. The Er-doped and Tm-doped optical fibers were used for this reason. Therefore, the Tm-doped optical fiber which is used in this embodiment can be used as an optical fiber for light amplification, depending on the wavelength band of the signal light.

Specifically, Er, T m, Pr, Nd, Ho, and the like be used as the rare earth element, though there is no restriction on this.

The wavelength of the absorption loss control light is selected as appropriate based on the kind of the optical fiber for light loss, and preferably should not coincide with the wavelength band of the signal light.

When using the Tm-doped optical fiber, an appropriate wavelength of the absorption loss control light for the Tm-doped optical fiber is selected from, for example, 1500 nm to 1700 nm. When the signal light is in a wavelength 1.55 μm band (1540 nm to 1560 nm), the wavelength of the absorption loss control light of 1.6 μm band (1580 nm to 1700 nm), or more ideally, the wavelength of the absorption loss control light of 1580 nm to 1650 nm, should preferably be selected so as not to coincide with the wavelength band of the signal light.

What is claimed is:

1. An optical fiber amplifier comprising:
   an optical fiber amplification section; and
   an optical fiber for light loss which is provided in a later stage than said optical fiber amplification section or midway therein, the amount of signal light absorption and the wavelength dependency of the absorption of said optical fiber for light loss changing according to the power of input light;
   wherein the optical fiber amplifier further comprises an absorption loss control light source which inputs an absorption loss control light for controlling the amount of light absorption in the optical fiber for light loss and the wavelength dependency of the absorption; and
   wherein the absorption loss control light source inputs the absorption loss control light into the optical fiber for light loss.

2. The optical fiber amplifier according to claim 1, said optical fiber amplification section comprising a first optical fiber amplification section and a second optical fiber amplification section, said optical fiber for light loss being provided between the first and second optical fiber amplification sections;
   the optical fiber amplifier further comprising
   a gain constant controller which monitors the power of signal light which is input to said first optical fiber amplification section, and the power of signal light which is output from said first optical fiber amplification section, and makes the gain of said first optical fiber amplification section constant;
   a gain controller which monitors the power of signal light which is output from said second optical fiber amplification section, and controls the gain of said second optical fiber amplification section so that the power of said signal light output therefrom becomes constant; and
   an absorption loss controller which monitors the power of signal light which is input to said first optical fiber amplification section, and the power of signal light which is output from said optical fiber for light loss, and controls the light absorption characteristic of said optical fiber for light loss.

3. The optical fiber amplifier according to claim 2, said absorption loss controller controlling the light absorption characteristic of said optical fiber for light loss by controlling the power of absorption loss control light which is input from said absorption loss control light source to said optical fiber for light loss.

4. The optical fiber amplifier according to claim 1, an optical fiber for light amplification which comprises said optical fiber amplification section being a rare earth doped fiber in which a rare earth element for light amplification has been doped to a core.

5. The optical fiber amplifier according to claim 4, said optical fiber for light amplification comprising an Er-doped optical fiber.

6. The optical fiber amplifier according to claim 1, said optical fiber for light loss comprising a rare earth doped fiber in which a rare earth element for loss of a signal light has been doped to a core.

7. The optical fiber amplifier according to claim 6, said optical fiber for light loss comprising a Tm-doped optical fiber.

8. The optical fiber amplifier according to claim 7, said signal light being in a 1.55 μm band, and the wavelength band of said absorption loss control light being in a 1.6 μm band.

9. An optical fiber amplifier comprising:
   an optical fiber amplification section; and
   an optical fiber for light loss which is provided in a later stage than said optical fiber amplification section or midway therein, the amount of signal light absorption and the wavelength dependency of the absorption of said optical fiber for light loss changing according to the power of input light;
   wherein the optical fiber amplifier further comprises an absorption loss control light source which inputs an absorption loss control light for controlling the amount of light absorption in the optical fiber for light loss and the wavelength dependency of the absorption; and
   wherein the absorption loss control light source inputs the absorption loss control light into the optical fiber for light loss from the rear of the optical fiber for light loss.

* * * * *